United States Patent [19]

Mullen

[11] 3,801,169

[45] Apr. 2, 1974

[54] BALL AND SOCKET JOINT

[75] Inventor: William P. Mullen, Detroit, Mich.

[73] Assignee: Ford Motor Company, Dearborn, Mich.

[22] Filed: Sept. 7, 1972

[21] Appl. No.: 287,116

[52] U.S. Cl. .................................................. 308/72
[51] Int. Cl. ............................................ F16c 23/00
[58] Field of Search ......... 308/72; 287/88, 89; 85/4, 85/DIG. 2

[56] References Cited
UNITED STATES PATENTS
3,259,408   7/1966   Herbenar .............................. 308/72
3,516,136   6/1970   Carter et al. .......................... 308/72

FOREIGN PATENTS OR APPLICATIONS
1,053,655   0/1953   France ................................. 308/72

*Primary Examiner*—Charles J. Myhre
*Assistant Examiner*—R. H. Lazarus
*Attorney, Agent, or Firm*—Keith L. Zerschling; Clifford L. Sadler

[57] ABSTRACT

A ball and socket joint useful for providing a pivotal connection between a pair of members such as a rod and a sheet metal plate. The joint includes a pair of nesting members that define a socket and rotatably support a ball. The socket members have circumferentially spaced prong portions constructed to fit through an aperture in a metal plate and to grip the edge of the aperture. A ball has a central opening constructed to receive a rod of a linkage system.

9 Claims, 6 Drawing Figures

BALL AND SOCKET JOINT

BACKGROUND AND SUMMARY OF THE DISCLOSURE

The present invention relates generally to ball and socket joints and, more particularly, to such a joint that is particularly useful in providing a connection between a linkage system and a metal plate.

In accordance with the preferred embodiment of this invention, the ball and socket joint is particularly characterized by its simplicity of construction and economy of manufacture.

In the presently preferred embodiment, the socket portion of a ball and socket joint comprises a pair of nesting members each of which defines one-half of a ball receiving socket. Each member has a base portion and three upstanding prong portions. The socket members are constructed to engage an aperture in a metal plate with the prong portions arranged in interdigital fashion and gripping the edge of the aperture.

A ball is disposed within the socket defined by the two socket parts and has an internal opening for supporting a rod.

BRIEF DESCRIPTION OF THE DRAWINGS

The many objects and advantages of a ball and socket joint constructed in accordance with this invention will become apparent upon consideration of the following detailed description and the accompanying drawings, in which.

DETAILED DESCRIPTION OF THE PREFERRED EMBODIMENT

Figure 1:
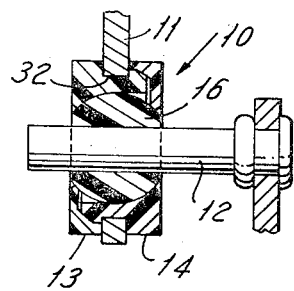
FIG. 1 is a sectional view of a ball and socket joint constructed in accordance with this invention and interconnecting a plate and a shaft or rod.
Figure 3:
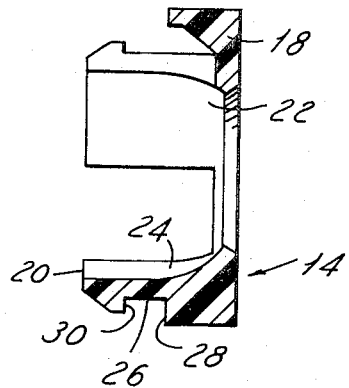
FIG. 3 is a sectional view of one of the socket members or parts.
Figure 4:
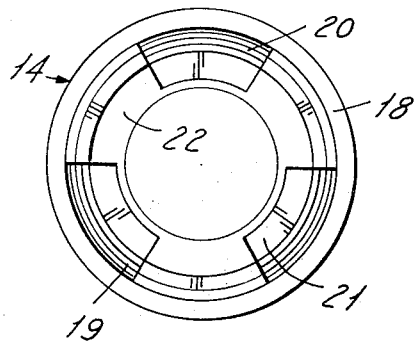
FIG. 4 is an end view of the socket member.
Figure 6:
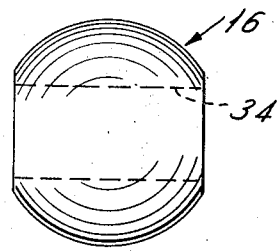
FIG. 6 is an elevational view of the ball member.
Figure 2:
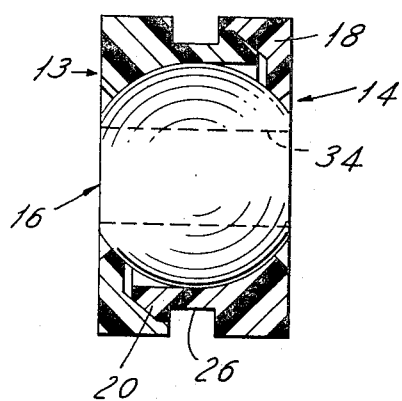
FIG. 2 is an enlarged sectional view of the ball and socket members of the joint shown in FIG. 1.
Figure 5:
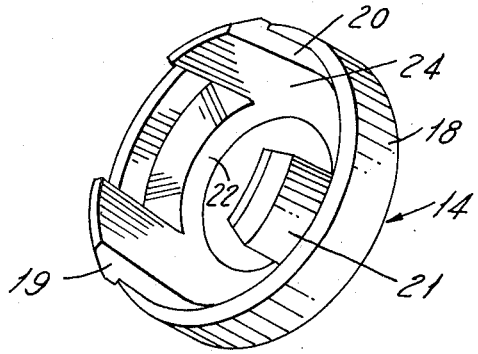
FIG. 5 is a perspective view of the same socket member.

Referring now to the drawings, wherein the presently preferred embodiment of this invention is disclosed, FIG. 1 illustrates a ball and socket joint assembly 10 interconnecting a plate 11 and a rod 12 such as might be used in a linkage mechanism.

The ball and socket joint 10 comprises a pair of socket parts or members 13 and 14 that nest together to define a ball receiving socket surface. A ball 16 is disposed within the socket.

The socket members 13 and 14 are of identical construction. Each socket member comprises an annular base portion 18 from which extend three circumferentially spaced prong portions 19, 20 and 21. The interior surface 22 of the annular base 18 defines a portion of the socket surface. The interior surface of each of the upstanding prong portions 19, 20 and 21 also defines a portion of the ball receiving socket. The interior surface of the prong portion 20 is identified by reference numeral 24.

A groove is provided on the exterior of each of the upstanding prong portions 19, 20 and 21, such as groove 26 of prong 20. A ledge 28, that constitutes the upper surface of the base portion 18, is spaced from a shoulder 30 formed on the exterior of the prong 20. The ledge 28 and the shoulder 30 form two of the three sides of the groove 26.

As previously stated, the socket members 13 and 14 are of identical construction and are arranged to nest together to define a ball receiving socket. Each of the upstanding prong portions 19, 20 and 21 extends for approximately 60° around the periphery of the socket member with a 60° space between adjacent prongs. The two socket members 13 and 14 fit together with their prong portions deposed in interdigital fashion.

The ball 16 has a spherical exterior surface and an interior bore 34 to receive the rod 12. In reality, therefore, the ball 16 constitutes an annular member.

OPERATION

To assemble the joint 10, one or the other of the socket parts 13 or 14 is pressed into engagement with the plate 11 by inserting its three prong portions through a circular aperture 32 in plate 11. The sockets 13 and 14 are designed to be molded of a flexible plastic material such as nylon whereby the fingers 19, 20 and 21 have sufficient resiliency that they may be snapped through the opening 32 with the periphery of the opening being seated in the groove 26 of each of the three prongs. In effect, the shoulder 30 on the prong 20 forms a barb that grips the edge of the aperture 32.

The ball 16 is positioned within the first socket member secured in the opening 32. The prong portions of the second socket member are then forced through the aperture 32 from the opposite side of the plate 11. The prong portions of the second socket part are inserted into the spaces between the three prongs of the first socket member already positioned in the opening 32.

Thus, the two socket members 13 and 14 cooperate to define a ball receiving interior surface. The exterior surfaces of the socket members 13 and 14 cooperate to define an annular groove 26 extending circumferentially around the assembled members 13, 14 that receives the edge of the opening 32. The edge of the opening 32 is gripped between the ledge 28 and shoulder 30 of each of the prong portions.

The resiliency of the socket elements 13 and 14 provides a construction permitting snap-together assembly. The ball 16 is thus trapped in position and the assembly is completed by inserting the rod 14 through the interior opening 34 of the ball 16.

A ball and socket joint constructed in accordance with this invention is particularly advantageous for providing an articulated support for a linkage element on a plate. The ball and socket parts are inexpensive to manufacture, being injection molded plastic pieces. In addition, the parts are easily assembled to form the final joint.

The foregoing description presents the presently preferred embodiment of this invention. Alterations and modifications may occur to those skilled in the art that will come within the scope and spirit of the following claims.

I claim:

1. A ball and socket joint constructed to provide an articulated connection between first and second pivotally related members, said joint comprising a plurality of interfitting socket parts, said socket parts defining a ball receiving socket, said first member having an aperture therein, said socket parts having resilient portions gripping the periphery of said aperture, a ball part slidably received within said interfitting socket parts, said ball part being constructed to be connected to said second member.

2. A ball and socket joint according to claim 1 and including:

said socket parts being of identical interchangeable construction.

3. A ball and socket joint according to claim 1 and including:

each of said socket parts having a base portion and a plurality of spaced apart upstanding portions extending from said base portion, said pair of socket parts being constructed to fit together with said upstanding portions being interdigitally arranged.

4. A ball and socket joint according to claim 3 and including:

said socket parts being of identical interchangeable construction.

5. A ball and socket joint constructed to connect first and second pivotally related members, said joint comprising a pair of socket parts, each of said socket parts having a base portion and a plurality of spaced apart upstanding portions extending from said base portion, said pair of socket parts being constructed to fit together with said upstanding portions being interdigitally arranged, said first member having an edge defining an aperture, said upstanding portions each having means constructed to grip said edge, said pair of socket pairs defining a ball receiving socket surface, a ball disposed within said socket parts, said ball being constructed to be connected to said second member.

6. A ball and socket joint according to claim 5 and including:

said socket parts being of identical interchangeable construction, said base portions being of annular configuration.

7. A ball and socket joint constructed to connect first and second pivotally related members, said joint comprising a pair of socket parts, said socket parts being of identical interchangeable construction, each of said parts having an annular base portion and a plurality of spaced apart upstanding portions extending from said base portion, said pair of socket parts being constructed to fit together with said upstanding portions being interdigitally arranged, a groove formed on the exterior surface of each of said upstanding portions, said grooves of said upstanding portions combining to define an annular groove when said pair of socket parts are positioned with said upstanding portions in interdigital relationship, said first member having an edge defining an aperture, said edge being constructed to fit in said annular groove, said pair of socket parts defining a ball receiving socket surface, a ball disposed within said socket parts, said ball being constructed to be connected to said second member.

8. A ball and socket joint interconnecting first and second pivotally related members, said joint comprising first and second socket parts, said first and second socket parts being of identical interchangeable construction, each of said socket parts having an annular base portion and three spaced apart resilient upstanding portions, said first and second socket parts being fitted together with said upstanding portions being interdigitally arranged, a groove formed on the exterior surface of each of said upstanding portions, said grooves of said upstanding portions combining to define an annular groove when said pair of socket parts are positioned with said upstanding portions in interdigital relationship, said first member having an edge defining an aperture, said edge being fitted in said annular groove with said base portion of said first socket part being disposed on one side of said first member and said base portion of said second socket part being disposed on the other side of said first member, said pair of socket parts defining a ball receiving socket surface, a ball disposed within said socket parts, said ball having means constructed to connect it to said second member.

9. A ball and socket joint according to claim 8 and including:

said socket parts and said ball being molded of plastic material.

* * * * *